US009881151B2

(12) United States Patent
Chen et al.

(10) Patent No.: US 9,881,151 B2
(45) Date of Patent: Jan. 30, 2018

(54) PROVIDING SELECTIVE SYSTEM PRIVILEGES ON AN INFORMATION HANDLING DEVICE

(75) Inventors: Liang Chen, Raleigh, NC (US); Joshua N. Novak, Wake Forest, NC (US); Rod D. Waltermann, Rougemont, NC (US); David Rivera, Durham, NC (US); Jun Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/222,033

(22) Filed: Aug. 31, 2011

(65) Prior Publication Data

US 2013/0055377 A1   Feb. 28, 2013

(51) Int. Cl.
*G06F 21/54* (2013.01)

(52) U.S. Cl.
CPC .................................. *G06F 21/54* (2013.01)

(58) Field of Classification Search
CPC .......... G06F 21/53; G06F 21/54; G06F 21/50; G06F 21/33
USPC ....... 710/17; 713/154, 2; 726/11, 17, 22, 23, 726/30, 4
See application file for complete search history.

(56) References Cited

U.S. PATENT DOCUMENTS

| | | | |
|---|---|---|---|
| 6,378,127 B1* | 4/2002 | Delo | G06F 8/61 717/174 |
| 7,203,774 B1* | 4/2007 | Zhou et al. | 710/17 |
| 8,219,828 B2* | 7/2012 | Maetz et al. | 713/190 |
| 8,301,874 B1* | 10/2012 | Heidingsfeld et al. | 713/2 |
| 2002/0147973 A1* | 10/2002 | Fordemwalt | G06F 9/4411 717/174 |
| 2003/0154399 A1* | 8/2003 | Zuk et al. | 713/201 |
| 2004/0199763 A1* | 10/2004 | Freund | 713/154 |
| 2005/0149729 A1* | 7/2005 | Zimmer et al. | 713/168 |
| 2007/0028120 A1* | 2/2007 | Wysocki et al. | 713/192 |
| 2008/0148298 A1* | 6/2008 | Chatterjee et al. | 719/328 |
| 2009/0031402 A1* | 1/2009 | Jung et al. | 726/4 |
| 2009/0205037 A1* | 8/2009 | Asakura | 726/10 |
| 2010/0058317 A1* | 3/2010 | Braams | 717/171 |
| 2010/0138933 A1* | 6/2010 | Yamashita | 726/30 |
| 2010/0229242 A1* | 9/2010 | Iga | 726/27 |

OTHER PUBLICATIONS

Anderson et al., Inglorious Installers: Security in the Application Marketplace, May 2010, 45 pages.*

* cited by examiner

*Primary Examiner* — Eleni Shiferaw
*Assistant Examiner* — Huan V Doan
(74) *Attorney, Agent, or Firm* — Ference & Associates LLC

(57) ABSTRACT

Devices, methods and products are described that provide for selective system or root level access for applications on an information handling device. One aspect provides a method comprising determining whether an application has system privileges on an information handling device; and executing privileged code from the application on said information handling device responsive to determining that the application has system privileges through one or more native services operating on said information handling device. Other aspects and embodiments are also described herein.

17 Claims, 4 Drawing Sheets

US 9,881,151 B2

PROVIDING SELECTIVE SYSTEM PRIVILEGES ON AN INFORMATION HANDLING DEVICE

BACKGROUND

Information handling device manufacturers provide users with limited device privileges, restricting access to device files, hardware, and software applications. Limiting user privileges protects the integrity of devices and facilitates more effective technical support. Root access to a device provides full control over a device. Consumers are generally only granted "user" level privileges, which provide a high level of functionality, but does not allow for full control over all aspects of a particular device. As such, a typical information handling device is configured to allow limited access and modify (e.g., install device updates or applications) a device without providing any form of root access.

BRIEF SUMMARY

In summary, one aspect provides an information handling device comprising: one or more processors; a memory in operative connection with the one or more processors; wherein, responsive to execution of program instructions accessible to the one or more processors, the one or more processors are configured to: determine whether an application has system privileges; and execute privileged code from the application responsive to determining that the application has system through one or more native services operating on said information handling device.

Another aspect provides a method comprising: determining whether an application has system privileges on an information handling device; and executing privileged code from the application on said information handling device responsive to determining that the application has system through one or more native services operating on said information handling device.

A further aspect provides a program product comprising: a storage medium having program code embodied therewith, the program code comprising: program code configured to determine whether an application has system privileges on an information handling device; and program code configured to execute privileged code from the application on said information handling device responsive to determining that the application has system through one or more native services operating on said information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
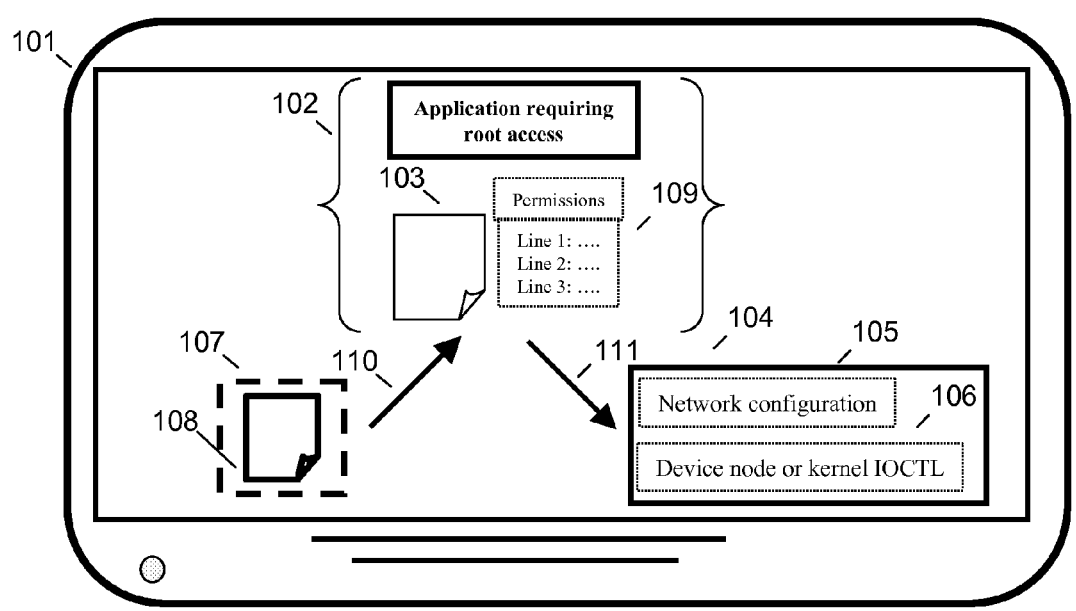
FIG. 1 provides an example of installing an application on an information handling device configured according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

An attractive feature of current information handling devices is the ability to enhance device functionality by installing applications. Current technology provides for a seemingly unlimited array of applications. For example, applications exist for accessing media content, games, wallpaper, interacting with social media web sites, working with documents, and enhancing device functions, such as GPS and camera functions, by integrating them with other data sources and augmented interfaces.

According to existing technology, root access to an information handling device provides full control over a device. Consumers are generally only granted "user" level privileges, which provide a high level of functionality, but does not allow for full control over all aspects of a particular device. As such, when a typical user updates or modifies their information handling device, for example, by installing an application, they are performing this action with limited privileges. However, certain applications require access to the device with root privileges in order to properly install and be fully functional.

One method that the community of information handling device users has developed for installing applications that require root privileges is to gain unauthorized access to the device. Certain device users are able to gain root access to their devices by "rooting" or "jailbreaking" their devices. In general, jailbreaking refers to obtaining root access on iOS® devices, such as an iPhone® or iPad®, while rooting refers to obtaining root access on an Android® based device. iPhone® and iPad® are registered trademarks of Apple Inc. Android® is a trademark of Google Inc. in the United States and other countries. iOS® is a registered trademark of Cisco in the United States and other countries. However, the terms rooting and jailbreaking are considered synonymous herein and may be used interchangeably. In general, rooting is a method to circumvent the firmware protections put on the device by the manufacturer and gain full access to the device. There is a multitude of methods for rooting an information handling device, each specific for the particular operating system powering the device.

In general, device manufacturers attempt to prevent users from rooting their devices. For example, manufacturers have added security features to prevent rooting, including providing fixes for security weaknesses, denying or limiting technical support for rooted devices, configuring devices to not respond to unsigned firmware or software applications, and denying certain features for rooted devices.

According to existing technology, the only feasible methods for granting root access are to completely deny or to fully allow root access. However, a number of third party applications have been developed that require limited access to certain protected information handling device elements, such as files, firmware, routing tables, device settings, networking configurations, device node access and kernel IO (IOCTL) control. In addition, these applications may not be configured to securely operate on a rooted device, for example, because they require secure data streams for proper operation. Device developers desire to approve certain of these applications for installation on their devices but without granting them full root access or having to root the device.

Embodiments provide for information handling devices configured to allow selective root access to a device while retaining the secured or unrooted status of the device. According to embodiments, an information handling device may be configured to grant limited access to protected system elements, for example, in order for an application to install or function properly. Non-limiting examples of protected system elements include files, firmware, settings, drivers, routing tables, and addresses. A pre-build native service with an associated API may be configured according to embodiments to allow applications to perform a root privilege task on a secure or unrooted information handling device.

Exemplary information handling devices according to embodiments may comprise devices operating through mobile operating systems, including, but not limited to the Android®, Blackberry®, Windows Phone 7®, iOS® operating systems, and any other operating system capable of operating an information handling device. Blackberry® is a registered trademark of Research In Motion Limited. Windows® and Windows Phone 7® are registered trademarks of Microsoft Corporation. Illustrative and non-restrictive examples of information handling devices include cell phones (e.g., smartphones), tablet computers, notebook computers, embedded computing systems, gaming consoles, e-readers, desktop computing devices, personal digital assistants (PDAs), TV streaming devices, kiosk terminals, point of sale devices, and in car entertainment (ICE) devices.

Referring to FIG. 1, therein is depicted an example of installing an application on an information handling device configured according to an embodiment. An application requiring root access 102 is downloaded to the information handling device 101. An exemplary application is a virtual private network (VPN) application. In the example depicted in FIG. 1, the information handling device 101 is an unrooted tablet computing device running the Android® operating system. The application 102 may be third party software or may have been developed by the device manufacturer or system developer. According to embodiments, the device manufacturer, system developer, or other party affiliated with the information handling device may sign the application 102 or may provide the application developer with some form of signature. In FIG. 1, the application 102 is signed through a certificate 103.

Proper and full installation of the application 102 depicted in FIG. 1 requires installation of a driver and access to protected device elements 104. Exemplary protected device elements 104 that the application 102 may modify during installation and operation include network configurations 105 and the device node or kernel IOCTL 106. Root access by the application 102 to the protected device elements 104 is not allowed.

When the application 102 is installed, a permission vector 107 on the device 101 performs a permission check 110 on the application 102. As a non-limiting example, the permission vector may comprise a software service interrupter. Embodiments provide that the permission check determines whether the certificate 103 matches a device key 108. As a non-limiting example, the device key 108 may be a platform key used to sign the device image. An additional embodiment provides that the device key 108 may be comprised of a public key stored on or accessed from the device. According to embodiments, the permission check determines the permission level 109 granted to the application 102. If the certificate 103 matches and the permission level 109 allows for root access, the application 102 is allowed to operate with specified root privileges 111.

Although a VPN application has been used as an exemplary third party application requiring access to protected system elements, embodiments are not so limited. Any application capable of being configured to access protected system elements as disclosed herein may be utilized according to embodiments, for example, such as a system wide or socks level proxy client application.

Figure 2:
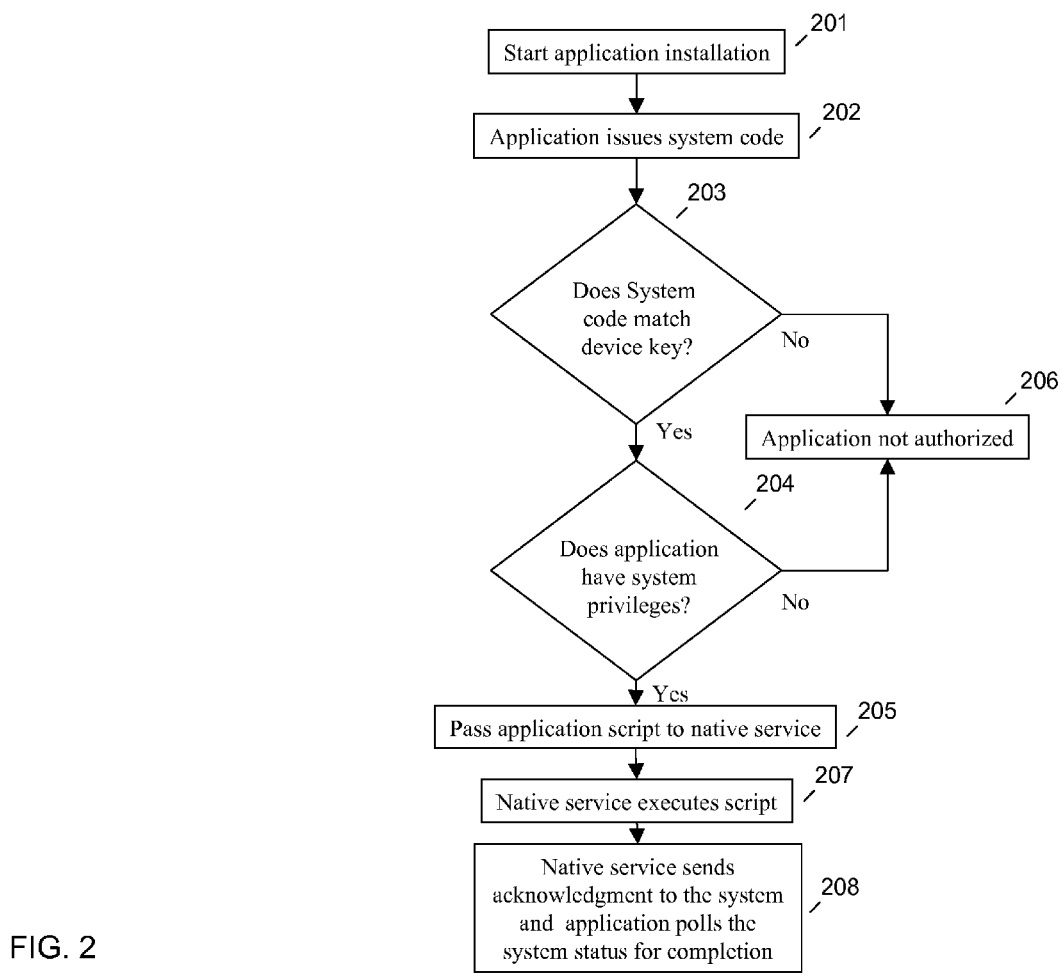
FIG. 2 provides a flow diagram of an example of permission or privilege checking according to an embodiment.

FIG. 2 provides a flow diagram of an example of permission or privilege checking according to an embodiment. Installation of a third party application is initiated on the information handling device 201. The third party application issues system code that locates the permission vector running on the device 202. The permission vector determines whether the system code matches the device key 203 and whether the third party application has system privileges 204. If the system code and the privileges allow for root access, the third party application passes a script to the native service 205; otherwise, the application is not authorized for system or root access 206. According to embodiments, the native service provides an interface for the third party application to run a script or command. In addition, the native service may be configured according to embodiments to run any received script or code with system or root privileges. The native service executes the script from the third party application with system privileges 207. The native service through operating system sends an acknowledgement to the system. The third party application may pull the system status that the script has executed along with results from running the script (e.g., operating system API calls, network status, and the like) 208.

Figure 3:
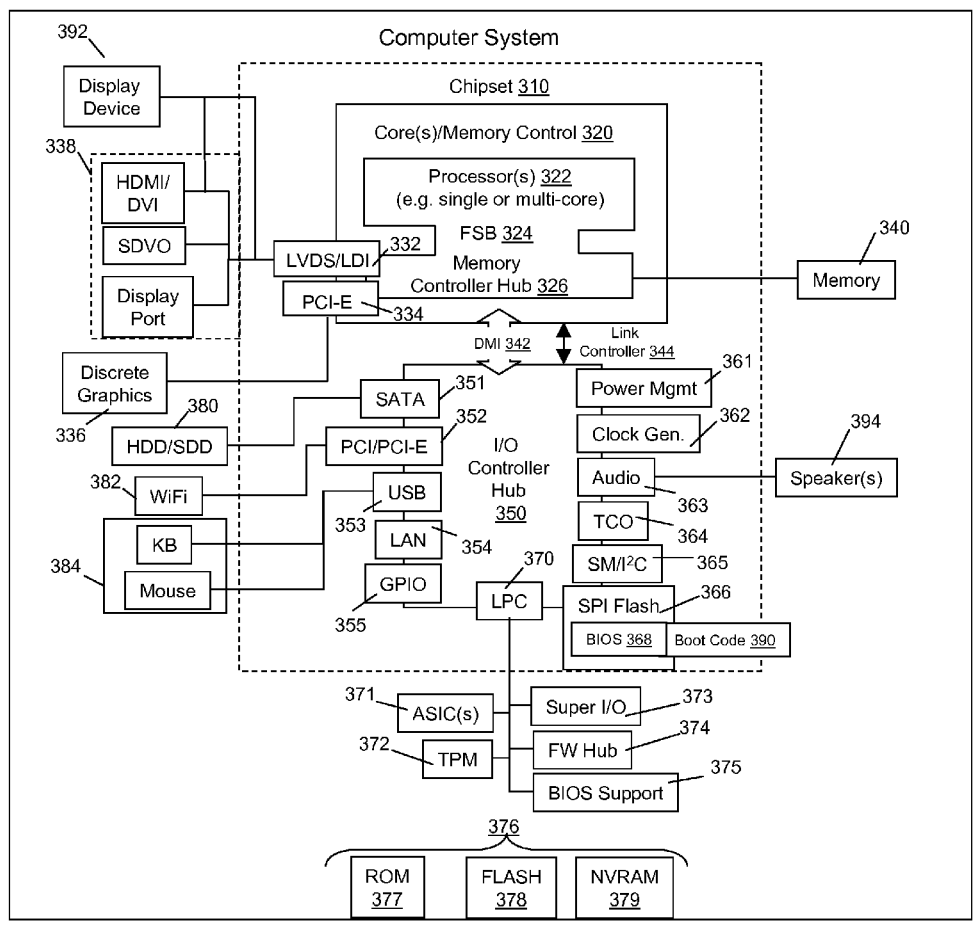
FIG. 3 illustrates an example circuitry of an information handling device.

While various other circuits, circuitry or components may be utilized, FIG. 3 depicts a block diagram of one example of information handling device circuits, circuitry or components. The example depicted in FIG. 3 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 3.

The example of FIG. 3 includes a so-called chipset 310 (a group of integrated circuits, or chips, that work together, chipsets) with an architecture that may vary depending on manufacturer (for example, INTEL, AMD, ARM, etc.). The architecture of the chipset 310 includes a core and memory control group 320 and an I/O controller hub 350 that exchanges information (for example, data, signals, commands, et cetera) via a direct management interface (DMI) 342 or a link controller 344. In FIG. 3, the DMI 342 is a chip-to-chip interface (sometimes referred to as being a link between a "northbridge" and a "southbridge"). The core and memory control group 320 include one or more processors 322 (for example, single or multi-core) and a memory controller hub 326 that exchange information via a front side bus (FSB) 324; noting that components of the group 320 may be integrated in a chip that supplants the conventional "northbridge" style architecture.

In FIG. 3, the memory controller hub 326 interfaces with memory 340 (for example, to provide support for a type of RAM that may be referred to as "system memory" or "memory"). The memory controller hub 326 further includes a LVDS interface 332 for a display device 392 (for example, a CRT, a flat panel, a projector, et cetera). A block 338 includes some technologies that may be supported via the LVDS interface 332 (for example, serial digital video, HDMI/DVI, display port). The memory controller hub 326 also includes a PCI-express interface (PCI-E) 334 that may support discrete graphics 336.

In FIG. 3, the I/O hub controller 350 includes a SATA interface 351 (for example, for HDDs, SDDs, 380 et cetera), a PCI-E interface 352 (for example, for wireless connections 382), a USB interface 353 (for example, for input devices 384 such as a digitizer, keyboard, mice, cameras, phones, storage, other connected devices, et cetera.), a network interface 354 (for example, LAN), a GPIO interface 355, a LPC interface 370 (for ASICs 371, a TPM 372, a super I/O 373, a firmware hub 374, BIOS support 375 as well as various types of memory 376 such as ROM 377, Flash 378, and NVRAM 379), a power management interface 361, a clock generator interface 362, an audio interface 363 (for example, for speakers 394), a TCO interface 364, a system management bus interface 365, and SPI Flash 366, which can include BIOS 368 and boot code 390. The I/O hub controller 350 may include gigabit Ethernet support.

The system, upon power on, may be configured to execute boot code 390 for the BIOS 368, as stored within the SPI Flash 366, and thereafter processes data under the control of one or more operating systems and application software (for example, stored in system memory 340). An operating system may be stored in any of a variety of locations and accessed, for example, according to instructions of the BIOS 368. As described herein, a device may include fewer or more features than shown in the system of FIG. 3.

Figure 4:
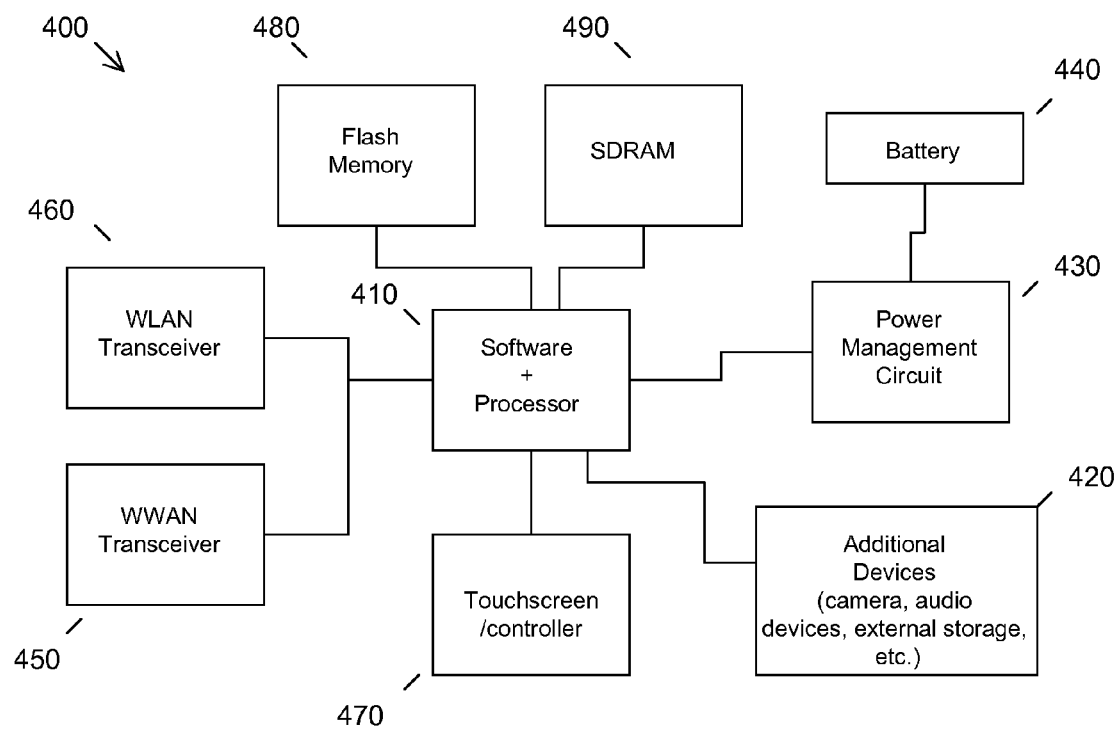
FIG. 4 illustrates another example circuitry of an information handling device.

For example, referring to FIG. 4, with regard to smart phone and/or tablet circuitry 400, an example includes INTEL, AMD, and ARM based systems (systems on a chip [SoC]) design, with software and processor(s) combined in a single chip 410. Internal busses and the like depend on different vendors, but essentially all the peripheral devices (420) may attach to a single chip 410. In contrast to the circuitry illustrated in FIG. 4, the tablet circuitry 400 combines the processor, memory control, and I/O controller hub all into a single chip 410. Also, INTEL, AMD, and ARM SoC based systems 400 do not typically use SATA or PCI or LPC. Common interfaces for example include SDIO and I2C. There are power management chip(s) 430, which manage power as supplied for example via a rechargeable battery 440, which may be recharged by a connection to a power source (not shown), and in the at least one design, a single chip, such as 410, is used to supply BIOS like functionality and DRAM memory.

INTEL, AMD, and ARM SoC based systems 400 typically include one or more of a WWAN transceiver 450 and a WLAN transceiver 460 for connecting to various networks, such as telecommunications networks and wireless base stations. Commonly, an INTEL, AMD, and ARM SoC based system 400 will include a touchscreen 470 for data input and display. INTEL, AMD, and ARM SoC based systems 400 also typically include various memory devices, for example flash memory 480 and SDRAM 490.

Embodiments may be implemented in one or more information handling devices configured appropriately to execute program instructions consistent with the functionality of the embodiments as described herein. In this regard, FIGS. 3-4 illustrate non-limiting examples of such devices and components thereof. While mobile information handling devices such as tablet computers, laptop computers, and smart phones have been specifically mentioned as examples herein, embodiments may be implemented using other systems or devices as appropriate.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
   one or more processors;
   a mobile operating system designating user and system privileges;
   a permission vector, wherein the permission vector performs a system level permission check during installation of an application;
   a memory in operative connection with the one or more processors, the memory storing instructions executable by the one or more processors to:
   retrieve an application from a remote device, wherein the application requires system privileges to the information handling device for full installation;
   begin installation of the application on the information handling device;
   during the installation of the application, determine using the permission vector operating on said information handling device, whether the application has system privileges via determining whether the application contains one or more certificates that match one or more device keys, wherein the one or more device keys comprise a platform key used to sign an image of said information handling device;
   during the installation of the application, execute non-privileged code from the application responsive to determining that the application has user privileges and not system privileges; and
   during the installation of the application, execute privileged code from the application responsive to determining that the application has system privileges.

2. The information handling device of claim 1, wherein the privileged code interacts with one or more privileged device elements.

3. The information handling device of claim 2, wherein the one or more privileged device elements comprise firmware, system files, networking configurations, device node access, and kernel input/output control.

4. The information handling device of claim 1, wherein determining whether the application has system privileges further comprises determining whether the privileged code has operating system granted root privileges.

5. The information handling device of claim 1, wherein the one or more device keys comprise a public key stored on said information handling device.

6. The information handling device of claim 1, wherein said information handling device is one of a cell phone, a tablet computing device, a notebook computing device, a television streaming device, a point-of-sale device, and in car entertainment (ICE).

7. The information handling device of claim 1, wherein the application comprises a virtual private network (VPN) application.

8. The information handling device of claim 1, wherein the application comprises a socks level proxy client application.

9. The information handling device of claim 1, wherein the application is a downloaded, on-device application.

10. A method comprising:
    retrieving, at an information handling device, an application from a remote device, wherein the application requires system privileges to the information handling device for full installation;
    begin installing the application on the information handling device;
    during the installation of the application, determining, using a permission vector operating on the information handling device, whether the application has system privileges via determining whether the application contains one or more certificates that match one or more device keys, wherein the one or more device keys comprise a platform key used to sign an image of said information handling device and wherein the permission vector performs a system level permission check during installation of an application;
    during the installation of the application, executing non-privileged code from the application responsive to determining that the application has user privileges and not system privileges; and
    during the installation of the application, executing privileged code from the application on said information handling device responsive to determining that the application has system privileges.

11. The method of claim 10, wherein the privileged code interacts with one or more privileged device elements.

12. The method of claim 11, wherein the one or more privileged device elements comprise firmware, system files, networking configurations, device node access, and kernel input/output control.

13. The method of claim 10, wherein the determining whether the application has system privileges further comprises determining whether the privileged code has operating system granted root privileges.

14. The method of claim 10, wherein the one or more device keys comprise a public application key stored on said information handling device.

15. The method of claim 10, wherein said information handling device is one of a cell phone, a tablet computing device, a notebook computing device, a television streaming device, a point-of-sale device, and in car entertainment (ICE).

16. The method of claim 10, wherein the application comprises a virtual private network (VPN) application.

17. A program product comprising:
a storage device having program code embodied therewith, the program code being executable by a processor and comprising:
program code that provides a mobile operating system designating user and system privileges;
program code that retrieves an application from a remote device, wherein the application requires system privileges to the information handling device for full installation;
program code that begin installation of the application on the information handling device;
program code that during the installation of the application, determines, using a permission vector operating on an information handling device, whether the application has system privileges on the information handling device via determining whether the application contains one or more certificates that match one or more device keys, wherein the one or more device keys comprise a platform key used to sign an image of said information handling device and wherein the permission vector performs a system level permission check during installation of the application;
program code that during the installation of the application, executes non-privileged code from the application responsive to determining that the application has user privileges and not system privileges; and
program code that during the installation of the application, executes privileged code from the application on said information handling device responsive to determining that the application has system privileges.

* * * * *